United States Patent
Okai et al.

(10) Patent No.: US 9,525,328 B2
(45) Date of Patent: Dec. 20, 2016

(54) ROTATING ELECTRIC MACHINE, IN PARTICULAR DOUBLE-FED ASYNCHRONOUS MACHINE WITH A POWER RANGE OF BETWEEN 20 MVA AND 500 MVA

(71) Applicant: ALSTOM Renewable Technologies, Grenoble (FR)

(72) Inventors: Ricardo Naoki Okai, Fislisbach (CH); Alexander Schwery, Kuettigen (CH); Hanspeter Walser, Laupersdorf (CH)

(73) Assignee: ALSTOM Renewable Technologies, Grenoble (FR)

( * ) Notice: Subject to any disclaimer, the term of this patent is extended or adjusted under 35 U.S.C. 154(b) by 37 days.

(21) Appl. No.: 14/306,746

(22) Filed: Jun. 17, 2014

(65) Prior Publication Data

US 2014/0292136 A1  Oct. 2, 2014

Related U.S. Application Data

(63) Continuation of application No. PCT/EP2012/076633, filed on Dec. 21, 2012.

(30) Foreign Application Priority Data

Dec. 22, 2011  (CH) ..................................... 2026/11

(51) Int. Cl.
*H02K 1/22* (2006.01)
*H02K 13/00* (2006.01)
(Continued)

(52) U.S. Cl.
CPC .............. *H02K 13/003* (2013.01); *H02K 1/22* (2013.01); *H02K 3/51* (2013.01); *H02K 17/22* (2013.01)

(58) Field of Classification Search
CPC .............. H02K 3/24; H02K 3/51; H02K 3/50; H02K 3/505; H01R 39/04; H01R 39/08; H01R 39/34
(Continued)

(56) References Cited

U.S. PATENT DOCUMENTS

| 2,001,319 | A |   | 5/1935 | Stanley |
| 3,089,048 | A | * | 5/1963 | Bahn ...................... H02K 3/505 310/231 |

(Continued)

FOREIGN PATENT DOCUMENTS

| CN | 1065679 C | 5/2001 |
| CN | 1090833 C | 9/2002 |

(Continued)

OTHER PUBLICATIONS

State Intellectual Property Office at People's Republic of China Search Report, dated Feb. 1, 2016.
(Continued)

*Primary Examiner* — Terrance Kenerly
*Assistant Examiner* — Ahmed Elnakib
(74) *Attorney, Agent, or Firm* — Dority & Manning, P.A.

(57) ABSTRACT

The invention proceeds from a rotating electric machine, in particular a double-fed induction machine in the power range between 20 MVA and 500 MVA, which comprises a rotor that rotates about a machine axis, is concentrically surrounded by a stator, and has a rotor plate body and a shaft, which rotor plate body bears a rotor winding that is arranged further outwards and is connected by means of connectors to slip rings that are arranged further inwards at the end of the shaft. A flexible and secure connection is achieved in that the connectors have mechanical connectors that run at right angles to the shaft to absorb forces arising owing to centrifugal acceleration, which mechanical connectors are connected on one side to a rotor winding head of the rotor winding and are supported on the other side on an auxiliary rim on the rotor plate body.

15 Claims, 3 Drawing Sheets

(51) Int. Cl.
*H02K 3/46* (2006.01)
*H02K 1/06* (2006.01)
*H02K 3/51* (2006.01)
*H02K 17/22* (2006.01)

(58) Field of Classification Search
USPC .............. 310/260, 270, 261.1, 194, 91, 348,
310/234, 233, 232, 231, 271, 12.31,
310/216.114, 216.116, 216.124, 216.121,
310/216.134, 216.113
See application file for complete search history.

(56) References Cited

U.S. PATENT DOCUMENTS

| | | | | |
|---|---|---|---|---|
| 3,445,703 | A | * | 5/1969 | Snively ................... H02K 3/16 310/204 |
| 5,635,785 | A | * | 6/1997 | Schwanda ................ H02K 1/26 310/216.004 |
| 6,020,670 | A | * | 2/2000 | Jones ....................... H02K 3/51 310/234 |
| 2009/0289519 | A1 | * | 11/2009 | Yanagisawa ............ H02K 3/51 310/214 |

FOREIGN PATENT DOCUMENTS

| | | | |
|---|---|---|---|
| CN | 101588104 A | 11/2009 | |
| DE | 195 19 127 | 9/1996 | |
| DE | 10 2009 03798 | 3/2011 | |
| EP | 0 736 953 | 10/1996 | |
| GB | 14680 | 0/1911 | |
| GB | 191014680 | * 0/1911 | ............... H02K 3/51 |
| JP | 61-104748 | 7/1986 | |
| JP | 2000-166159 | 6/2000 | |
| JP | 2007-104847 | 4/2007 | |
| JP | 2009-284579 | 12/2009 | |
| SU | 1617538 A1 | 12/1990 | |

OTHER PUBLICATIONS

Office action Issued from Canadian Patent Office dated Jan. 4, 2016 for CA Application No. 2,858,282.

Decision of Grant issued from Russian Patent Office dated Oct. 16, 2015 for RU Application No. 2014130075.

* cited by examiner

ROTATING ELECTRIC MACHINE, IN PARTICULAR DOUBLE-FED ASYNCHRONOUS MACHINE WITH A POWER RANGE OF BETWEEN 20 MVA AND 500 MVA

CROSS-REFERENCE TO RELATED APPLICATIONS

This application claims priority to PCT/EP2012/076633 filed Dec. 21, 2012, which claims priority to Swiss application 02026/11 filed Dec. 22, 2011, both of which are hereby incorporated in their entireties.

TECHNICAL FIELD

The present invention relates to the field of the generation of electrical energy. It relates to a rotating electric machine, in particular a double-fed asynchronous machine with a power range of between 20 MVA and 500 MVA, in accordance with the preamble of claim 1.

BACKGROUND

Double-fed asynchronous machines with a power range of from 20 MVA to 500 MVA can be used for variable-speed energy production. These machines are characterized by a distributed three-phase winding on the rotor. The rotor winding comprises individual bars which are embedded in slots in the rotor laminate stack. The bars are interconnected to form a winding in the end winding. The currents are fed via at least three slip rings, which are fastened on the rotor shaft at the end of the machine. A detail of such a machine is shown in FIG. 1 in a very simplified form. The asynchronous machine 10 illustrated in FIG. 1 has a machine axis 19. A central core 11 comprising a shaft 11a on which the slip rings 17 are arranged is rotatable about this axis 19. The rotor laminated core 12 is arranged around the central core 11, with an auxiliary rim 13 adjoining said rotor laminated core beneath an end winding 14 of the rotor winding. The rotor laminated core 12 is surrounded concentrically by a stator laminated core 15, in which a stator winding is accommodated which protrudes outwards at the end of the core 15 with a stator end winding 16.

The three phases of the rotor winding need to be connected to the slip rings 17 at the end of the shaft 11a. For this purpose, conductors (not illustrated) are accommodated in the shaft 11a, which conductors are connected firstly to the slip rings 17 and secondly to the end windings 14 at the level of the ends of the end windings. The connectors 18 (indicated by dashed lines in FIG. 1) passing at right angles to the shaft need to be insulated for the rotor test voltage. The connectors 18 carry the rated rotor current and in this case should not exceed the required limit temperature. The system of connectors 18 needs to be sufficiently flexible in the axial direction (at the connection point of the winding) and in the radial direction to enable the thermal expansion of the winding in the axial direction and the expansion of the rotor core in the radial direction to be accommodated. Finally, the connectors 18 need to be safeguarded with respect to the high centrifugal forces.

SUMMARY

An object of the invention therefore consists in providing a rotating electric machine of the type mentioned at the outset which satisfies the abovementioned demands.

The objet is achieved by a rotating electric machine of the type mentioned in claim 1.

In accordance with the invention, the rotating electric machine, in particular double-fed asynchronous machine with a power range of between 20 MVA and 500 MVA, comprises a rotor, which rotates about a machine axis, is surrounded concentrically by a stator and comprises a rotor laminated core and a shaft, which rotor laminated core bears a rotor winding which is arranged further outwards and which is connected via connectors to slip rings arranged further inwards at the end of the shaft. The invention is characterized by the fact that the connectors have mechanical connectors which run at right angles to the shaft, for absorbing forces occurring as a result of the centrifugal acceleration, and which are firstly connected to a rotor end winding of the rotor winding and are secondly supported on an auxiliary rim on the rotor laminated core.

One configuration of the machine according to the invention is characterized by the fact that the mechanical connectors are connected to the rotor end winding of the rotor winding via end winding connections, and that they are supported on the auxiliary rim via an extended auxiliary rim, which extends the auxiliary rim in the axial direction, preferably consists of layered laminations and forms a closed ring.

Another configuration is characterized by the fact that the mechanical connectors are at the same axial height as the end winding connections. As a result, bending stresses in the connectors are safely avoided.

A further configuration of the invention is characterized by the fact that the mechanical connectors cross through the extended auxiliary rim in the radial direction, said extended auxiliary rim being connected to the auxiliary rim via bolts, in order to avoid bending stresses in the mechanical connectors.

In accordance with another configuration, the mechanical connectors consist of an electrically conductive material which can be subjected to a high mechanical load, in particular of a steel.

In particular, the mechanical connectors can also be electrically connected to the rotor end winding or the end winding connections.

It is particularly advantageous if the mechanical connectors are electrically insulated by insulation surrounding them and if the centrifugal forces which are absorbed by the mechanical connectors are transmitted via ends, arranged at right angles, of the connectors and via insulation blocks arranged on the inner side of the auxiliary rim or of the extended auxiliary rim onto the auxiliary rim or extended auxiliary rim.

Another configuration of the invention is characterized by the fact that additional electrical connectors are provided for the actual transmission of current, which electrical connectors are connected electrically in parallel with the mechanical connectors.

Preferably, the electrical connectors pass outside the auxiliary rim or extended auxiliary rim for improved cooling.

In particular, the electrical connectors can consist of materials which can be subjected to a lower mechanical load but have good electrical conductivity, in particular copper.

A further configuration is characterized by the fact that the electrical connectors are bent back at right angles on the inner side in order to transmit the centrifugal forces arising, via insulation blocks, onto the inner side of the auxiliary rim or extended auxiliary rim, and by the fact that the electrical connectors are secured in the axial direction by outer terminating plates.

A further configuration of the invention is characterized by the fact that the electrical and mechanical connectors are electrically connected by connector connections, and by the fact that the connector connections are electrically connected to flexible transition pieces, which produce the contact with shaft feeders arranged on the shaft.

Preferably, the flexible transition pieces are U-shaped.

However, it is also possible for the flexible transition pieces to be constructed from individual laminations.

The transition pieces can also consist of a material which cannot be subjected to a high mechanical load but has good electrical conductivity, in particular copper.

In accordance with another configuration of the invention, in order to avoid an imbalance on the rotor, connectors are provided on the circumference, which connectors do not have either a mechanical or an electrical function.

BRIEF DESCRIPTION OF THE DRAWINGS

The invention will be explained in more detail below with reference to exemplary embodiments with reference to the drawing, in which.

DETAILED DESCRIPTION

Figure 1:
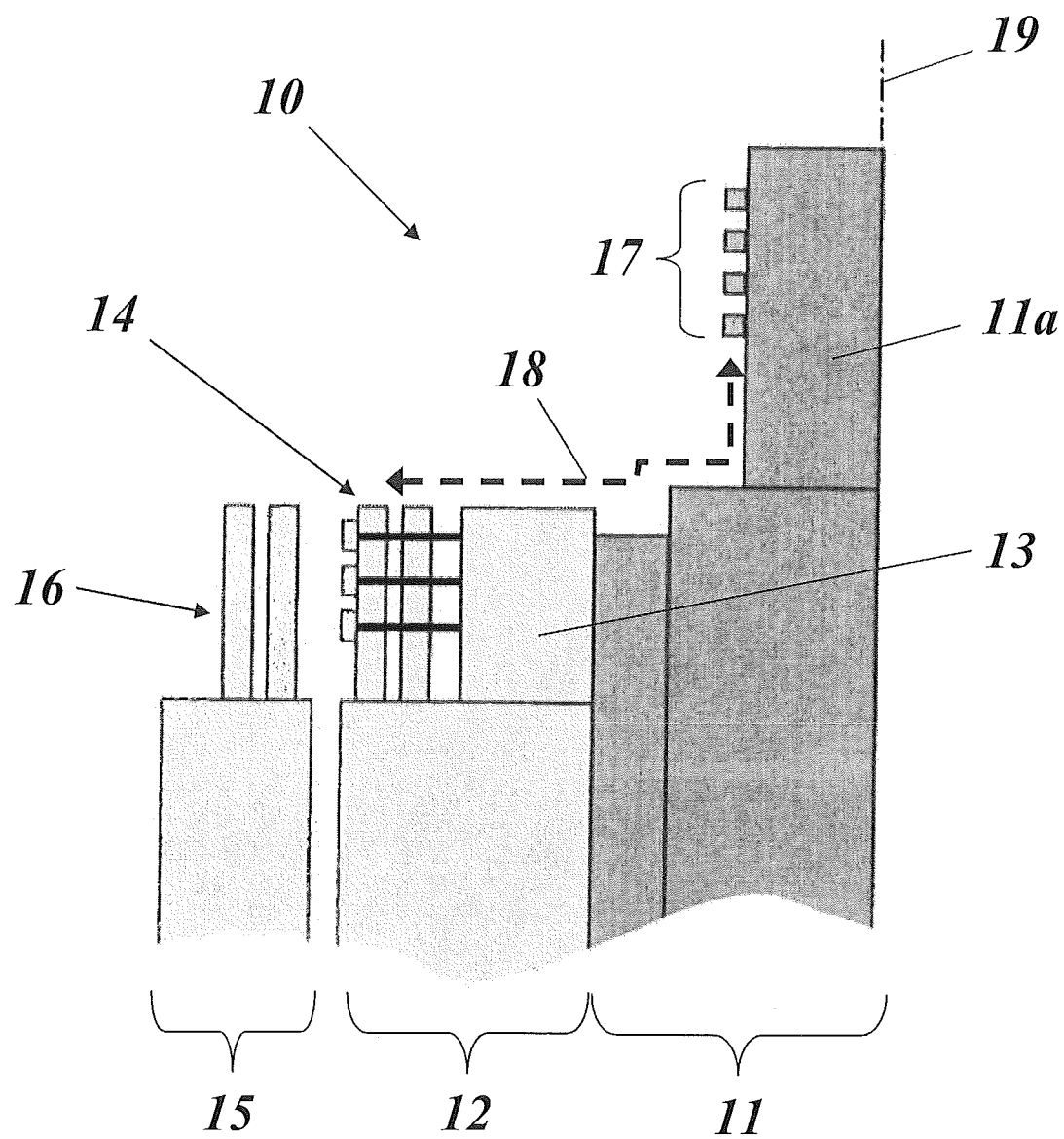
FIG. 1 shows a detail of an asynchronous machine in a very simplified form.
Figure 2:
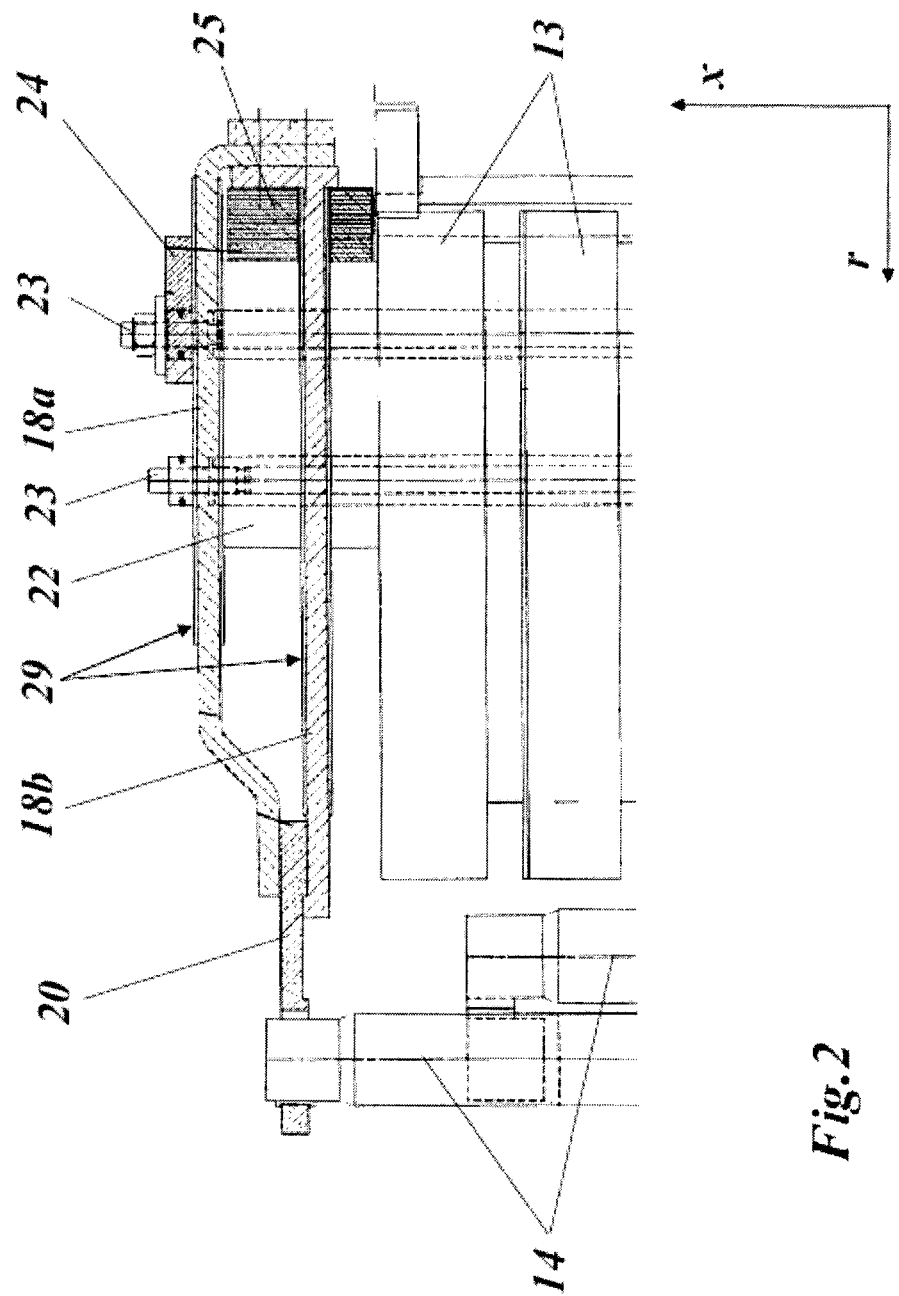
FIG. 2 shows, in a longitudinal section, the parallel arrangement of mechanical and electrical connectors in accordance with an exemplary embodiment of the invention.
Figure 3:
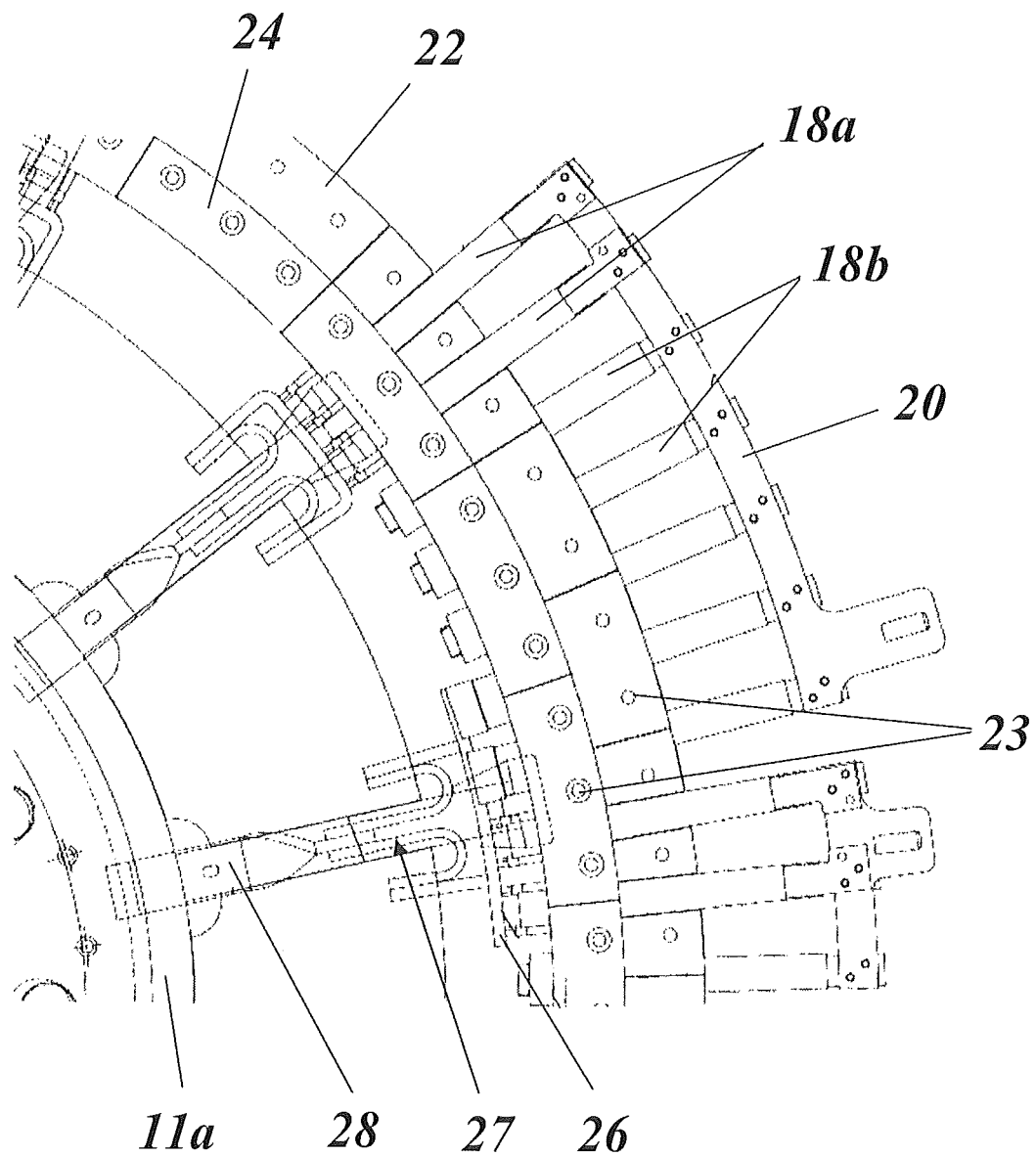
FIG. 3 shows the plan view in the axial direction of an arrangement as shown in FIG. 2.

The main component parts of rotor feeders or connectors 18 in accordance with an exemplary embodiment of the invention are illustrated in FIGS. 2 and 3. The current is passed from the slip rings 17 through the shaft 11a via shaft feeders 28 to connector connections 26. The actual connectors 18a, 18b produce the electrical contact between the connector connections 26 and the end winding connections 20, which are ultimately connected to the rotor winding (rotor end winding 14). The text which follows gives details of the function of the individual parts.

The end winding connections 20 produce the contact between the connectors 18a, 18b and the associated connection bars of the rotor winding; in this case they can be connected to a plurality of connectors 18a, 18b distributed over the circumference. They need to be configured, together with the connectors 18a, 18b, sufficiently flexibly so as to enable them to accommodate the axial thermal expansion (direction x in FIG. 2) of the winding.

The connectors 18a, 18b represent the actual heart of the present invention. FIG. 2 shows the basic division into electrical connectors 18a and mechanical connectors 18b. The task of the mechanical connectors 18b is to absorb the forces of the end winding connections 20 which arise as a result of the centrifugal acceleration and to pass these forces on to the auxiliary rim 13. For this purpose, the auxiliary rim 13 is extended in the axial direction by an extended auxiliary rim 22. The mechanical connectors 18b pass in the radial direction (direction r in FIG. 2) through the extended auxiliary rim 22, which comprises layered laminations and therefore forms a closed ring, which is connected to the auxiliary rim 13 via bolts 23. In order to avoid bending stresses in the connectors 18a, 18b, the mechanical connectors 18b are preferably located at the same axial height as the end winding connections 20.

The mechanical connectors 18b consist of a material which can be subjected to a high mechanical load and which can also be used as an electrical conductor, if required, such as steel, for example. The mechanical connectors 18b are also electrically connected to the end winding connections 20 and therefore contribute to the transmission of current, wherein this function is optional. If the mechanical connectors 18b are in direct contact with the electrical connectors 18a, they need to be insulated correspondingly. For this purpose, as shown in FIG. 2, firstly insulation which surrounds the connectors 18a, 18b directly and secondly an insulation block 25 which is located on the inner circumference of the extended auxiliary rim 22 are used. The centrifugal forces which are absorbed by the mechanical connectors 18b are transmitted by said mechanical connectors onto the extended auxiliary rim 22. The force transmission takes place via the ends of the connectors 18a, 18b which are arranged in the form of a rectangle onto the insulation blocks 25 and therefore onto the inner side of the extended auxiliary rim 22.

By virtue of this procedure, high additional radial forces on the tie bolts 23 are avoided, which additional radial forces would arise if the connectors 18a, 18b were connected directly to the bolts 23 as a result of shearing. Corresponding to the required tangential length of the end winding connections 20, said end winding connections are borne by one or more mechanical connectors 18b. In order that no imbalance occurs on the rotor as a result of the weight of the connectors 18a, 18b, "dummy connectors" can also be provided distributed over the circumference, which dummy connectors have neither a mechanical nor an electrical function.

If only small currents need to be transmitted, this can take place merely via the above-described mechanical connectors 18b. In the case of high currents and the losses associated therewith, the mechanical connectors 18b would be overheated, however. For this reason, preferably electrical connectors 18a are provided for the actual current transmission. Said electrical connectors are connected electrically in parallel with the mechanical connectors 18b if said mechanical connectors are also contributing to the transmission of current. The electrical connectors 18a pass outside the extended auxiliary rim 22 (FIG. 2) and are therefore cooled well. As a result of the rotation, mechanical forces also occur at these connectors 18a. In contrast to the mechanical connectors 18b, the electrical connectors 18a do not have to absorb any additional forces, however, and can therefore consist of materials which can be subjected to a lower mechanical load but have good conductivity in comparison with the mechanical connectors 18b, such as copper, for example. The electrical connectors 18a are bent back at right angles on the inner side in order to transmit the centrifugal forces arising via the insulation blocks 25 onto the inner side of the extended auxiliary rim 22. The electrical connectors 18a are secured in the axial direction by outer terminating plates 24.

The connectors 18a, 18b are electrically connected with the aid of the connector connections 26 (FIG. 3) on the inner side of the extended auxiliary rim 22. The centrifugal forces arising in the connector connections 26 are taken up by the extended auxiliary rim 22. For this purpose, they are supported radially via further insulation blocks. The connector connections 26 are electrically connected to flexible transition pieces 27, which produce the contact with special shaft feeders 28.

The shaft feeders 28 are connected to conductors (not illustrated) in the shaft 11a and are mounted fixedly on the arms of the rotor star of the asynchronous machine. Since the layered rotor laminated core 12 can expand during operation, a flexible connection in the radial direction is required between the shaft feeders 28 and the connectors 18a, 18b. This task is performed by the flexible transition pieces 27. For this purpose, said transition pieces can be provided with a U-shaped construction, as indicated in FIG. 3. If necessary, the flexible transition pieces 27 can also be constructed from individual laminations in order to achieve additional flexibility. The transition pieces 27 are not subjected to a high mechanical load since the shaft feeders 28 are borne by the rotor star arms, and the connector connections 26 are borne by the extended auxiliary rim 22. They can therefore consist of a material which cannot be subjected to a high mechanical load but has good conductivity, such as copper, for example.

The invention claimed is:

1. A rotating electric machine, the rotating electric machine being a double-fed asynchronous machine with a power range of between 20 MVA and 500 MVA, which comprises:
   a rotor, which rotates about a machine axis, is surrounded concentrically by a stator and includes a rotor laminated core and a shaft, which rotor laminated core bears a rotor winding which is arranged further outwards and which is connected via connectors to slip rings arranged further inwards at the end of the shaft, wherein the connectors comprise:
   (i) mechanical connectors of a first structure which run at right angles to the shaft, for absorbing forces occurring as a result of the centrifugal acceleration, and which are firstly electrically connected to a rotor end winding of the rotor winding and are secondly supported on an auxiliary rim on the rotor laminated core, and
   (ii) electrical connectors of a second structure provided for actual transmission of current, which electrical connectors are connected electrically in parallel with the mechanical connectors, wherein the first structure differs from the second structure; and
   a separate extended auxiliary rim attached to an axial end of the auxiliary rim axially beyond the windings, the mechanical connectors extending in a radial direction through the extended auxiliary rim, and the electrical connectors extending in a radial direction without passing through the extended auxiliary rim.

2. The rotating electric machine as claimed in claim 1, wherein the mechanical connectors are connected to the rotor end winding of the rotor winding via end winding connections, and wherein the extended auxiliary rim, which extends the auxiliary rim in the axial direction, contains layered laminations, and forms a closed ring.

3. The rotating electric machine as claimed in claim 2, wherein the extended auxiliary rim is connected to the auxiliary rim via bolts, in order to avoid bending stresses in the mechanical connectors.

4. The rotating electric machine as claimed in claim 1, wherein the mechanical connectors are at the same axial height as the end winding connections.

5. The rotating electric machine as claimed in claim 1, wherein the mechanical connectors are formed of a steel selected to absorb a higher mechanical load than the electrical connectors.

6. The rotating electric machine as claimed in claim 5, wherein the mechanical connectors are also electrically connected to the end winding connections.

7. The rotating electric machine as claimed in claim 6, wherein the mechanical connectors are electrically insulated by insulation surrounding them, and the centrifugal forces which are to be absorbed by the mechanical connectors are transmitted via ends, arranged at right angles, of the connectors and via insulation blocks arranged on the inner side of the auxiliary rim or of the extended auxiliary rim onto the auxiliary rim or extended auxiliary rim.

8. The rotating electric machine as claimed in claim 1, wherein the electrical connectors are formed of a copper selected to absorb a lower mechanical load than that of the mechanical connectors.

9. The rotating electric machine as claimed in claim 1, wherein the electrical connectors are bent back at right angles on an inner side in order to transmit the centrifugal forces arising, via insulation blocks, onto the auxiliary rim via the extended auxiliary rim, and wherein the electrical connectors are secured in the axial direction by outer terminating plates.

10. The rotating electric machine of claim 1, wherein the first structure and the second structure differ in material.

11. The rotating electric machine of claim 1, wherein the first structure and the second structure differ in shape.

12. A rotating electric machine, the rotating electric machine being a double-fed asynchronous machine with a power range of between 20 MVA and 500 MVA, which comprises: a rotor, which rotates about a machine axis, is surrounded concentrically by a stator and includes a rotor laminated core and a shaft, which rotor laminated core bears a rotor winding which is arranged further outwards and which is connected via connectors to slip rings arranged further inwards at the end of the shaft, wherein the connectors have (i) mechanical connectors which run at right angles to the shaft, for absorbing forces occurring as a result of the centrifugal acceleration, and which are firstly connected to a rotor end winding of the rotor winding and are secondly supported on an auxiliary rim on the rotor laminated core, and (ii) electrical connectors provided for actual transmission of current, wherein the electrical connectors are connected electrically in parallel with the mechanical connectors and the electrical connectors pass outside the auxiliary rim or extended auxiliary rim for improved cooling, wherein the electrical and mechanical connectors are electrically connected by connector connections, and wherein the connector connections are electrically connected to flexible transition pieces, which produce the contact with shaft feeders arranged on the shaft.

13. The rotating electric machine as claimed in claim 12, wherein the flexible transition pieces are U-shaped.

14. The rotating electric machine as claimed in claim 12, wherein the flexible transition pieces are constructed from individual laminations.

15. The rotating electric machine as claimed in claim 12, wherein the transition pieces are formed of copper.

* * * * *